June 11, 1963 N. E. BUSH 3,093,740

PULSE TRANSMITTER AND AMPLIFIER

Filed Sept. 29, 1959

WITNESSES

Leon J. Taza

Edward F. Possessky

INVENTOR

Nyle E. Bush

BY

Donald J. Smith

ATTORNEY 3,093,740

PULSE TRANSMITTER AND AMPLIFIER

Nyle E. Bush, Forest Hills, Pa., assignor to Westinghouse Electric Corporation, East Pittsburgh, Pa., a corporation of Pennsylvania Filed Sept. 29, 1959, Ser. No. 843,250
6 Claims. (Cl. 250—207)

Figure 1:
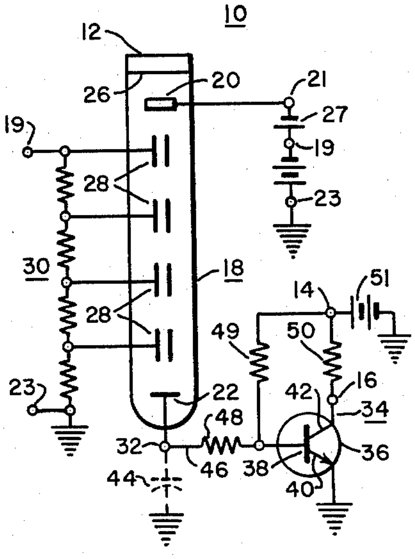

The present invention relates to arrangements of circuit elements for transmitting and amplifying electrical pulses that are to be used for actuating indicating or control apparatus.

It is elementary that a pulse of electrical energy, when represented as a function of time, can be defined by a summation of a series of trigonometric or sinusoidal and cosinusoidal functions, more commonly termed a Fourier series. Each sinusoidal and cosinusoidal function of the Fourier series is characterized with a frequency of alternation so that the pulse can be described as being comprised of a bandwidth of frequency components.

Whether an arrangement of circuit elements can purposefully transmit a pulse of electrical energy is, of course, determined by its capability to transmit the desired portion of the bandwidth of frequency components of the pulse. It is, therefore, not uncommon to refer to the capability of a circuit arrangement to transmit a certain range of frequency components as the bandwidth capability of that circuit arrangement.

Generally considered, a substantial factor in the determination of whether a circuit arrangement can, with considerable fidelity, transmit an input pulse having a given bandwidth of frequency components is the capability of the circuit arrangement to respond in a timely manner to actuation by the pulse. If the circuit arrangement imposes a substantial damping or first order differential effect upon certain of the frequency components comprising the pulse, some delay in transmittal of these components through the arrangement will occur to effect some loss of fidelity in the pulse. As a more specific notation, the delay in transmittal of these components results in a relatively slow rise time for the transmitted pulse.

In creating a circuit arrangement for uses in which the considerations just set forth are applicable, it is necessary that the circuit arrangement be arranged so that the desired operational characteristics are achieved without an encounter with bandwidth problems. With the remarks thus far set forth in the foreground, the present invention will be more fully understood.

Thus, it is an object of the invention to provide an arrangement of circuit elements for transmitting pulses of electrical energy originating in a given source so that the pulses can then be amplified for use in rendering some control or indicating function.

It is another object of the invention to provide an arrangement of circuit elements for amplifying pulses of electrical energy originating in a given source so that the pulses can be used to actuate control or indicating apparatus.

It is a further object of the invention to provide an arrangement of circuit elements including semi-conductive devices for amplifying pulses of electrical energy so that the pulses can be used to perform some control or indicating function.

It is yet another object of the invention to provide an arrangement of circuit elements for amplification and resolution of successive pulses of electrical energy originating in a given source and for discrimination against other random pulses so that the successive pulses can be used to perform some control or indicating function.

It is still another object of the invention to provide an arrangement of circuit elements for transmittal of successive pulses of electrical energy within the bandwidth capability of the arrangement so that the pulses can be resolved from each other.

Figure 2:
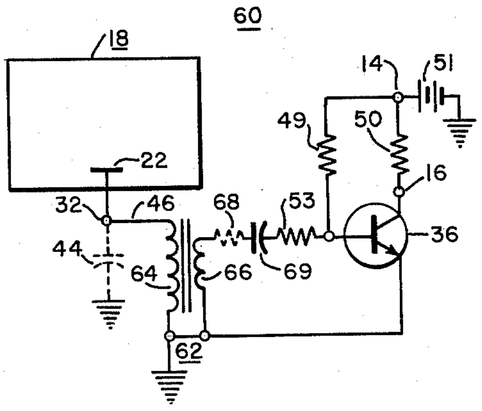
Figure 3:
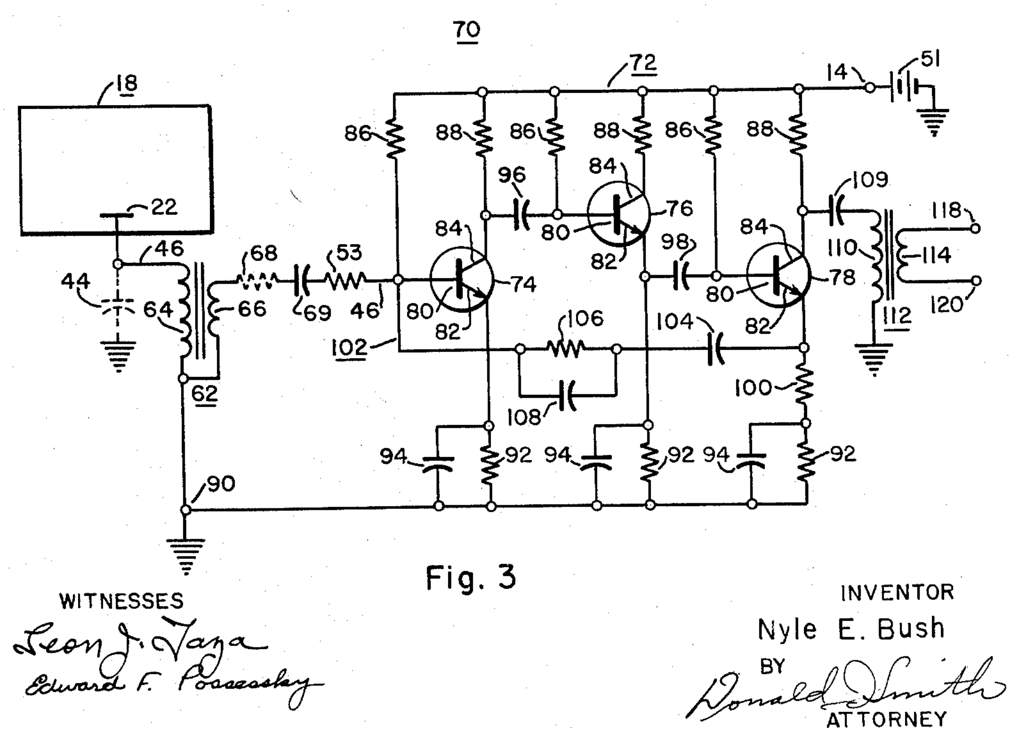

These and other objects of the invention will become more apparent upon consideration of the following detailed description of several illustrative embodiments of the invention as related to the accompanying drawing, in which:

FIGURE 1 is a schematic illustration of an arrangement of circuit elements for use in transmitting and amplifying electrical pulses in accordance with the principles of the invention;

FIG. 2 is a schematic illustration of another arrangement of circuit elements for use in transmitting and amplifying electrical pulses in accordance with the principles of the invention; and FIG. 3 is a schematic illustration of a circuit arrangement including substantially the arrangement of FIG. 2 together with a feedback amplifier for use in transmitting and amplifying electrical pulses in accordance with the principles of the invention.

With regard to the broad aspects of the invention, an arrangement of circuit elements provides for transmittal of pulses originating in a given source to the input of an amplifier so that successive pulses can be resolved or distinguished from one another even though, ordinarily, the amplifier bandwidth capability would be such as to obviate suitable amplification of the pulses through a blocking of elevated frequency components of the pulses. Successive pulses are transmitted to the amplifier so that a sufficient time interval exists between the pulses for satisfactory resolution of the pulses, and, additionally, so that the decay time of each of the successive pulses is greater than some reference interval of time which would preclude resolution of the pulses since the amplifier would not, in such an instance, provide sufficient gain for the prevalent or elevated frequency components of the pulses. In one embodiment of the invention, a feedback amplifier is included in the arrangement of circuit elements to furnish gain stability and increased bandwidth capability required for distinguishing the source pulses from other pulses randomly arising in the circuit arrangement. It is to be noted, of course, that the embodiments of the invention shown in the drawing will be described here only for purposes of exemplifying the invention.

An arrangement of circuit elements 10 shown schematically in FIG. 1 is provided for use as a radiation detector, but, with modifications obvious to those skilled in the art of the invention, the circuit arrangement 10 can readily be adapted for other uses. An input for the circuit arrangement 10 is formed, in effect, by a phosphor-type transducer 12 which converts incident radiation into scintillations of electromagnetic radiation, in this instance in the spectrum of visibility. An output for the circuit arrangement 10 is provided between output terminals 14 and 16.

Thus, the operation of the circuit arrangement 10 is such that discrete scintillations emanating from the phosphor transducer 12 are transformed into corresponding discrete pulses of electrical energy for transmittal through the output terminals 14 and 16 of the circuit arrangement 10. For purposes considered previously, the latter transformation occurs in a manner such that successive pulses can be resolved from each other and, additionally, distinguished from other pulses randomly arising in the circuit arrangement 10.

A photomultiplier tube 18 is provided for transforming the scintillations or pulses of electromagnetic radiation received from the transducer 12 into electrical pulses of relatively low energy. The photomultiplier tube 18 operates to transform any scintillation of electromagnetic radiation or light that is incident upon a suitably positioned cathode 20, of any well-known photoemissive material, into an emission of electrons that is representative of the scintillation. Of course, the emitted electrons are accelerated from the cathode 20 toward an anode 22 under a potential gradient imposed by a D.C. potential or voltage source 27 connected between a cathode terminal 21 and a ground or common system terminal 23.

It is to be noted, relative to the illustrative embodiment of FIG. 1, that the phosphor transducer 12 is cemented, as indicated by the reference character 26, to the photomultiplier tube 18 with any suitable and known optical cement in a position adjacent the cathode 20 so that the scintillations of the phosphor transducer 12 impinge upon the cathode 20. The voltage source 27, as generally noted before, is employed to maintain the cathode 20 at a desired negative level of potential, and, in addition, it is used to maintain a plurality of dynodes 28, or secondary emission elements, serially positioned along the length of the photomultiplier tube 18, at successively greater, or less negative, potentials through cooperative use of a resistance network 30. After consideration of the previous remarks, it will have been obvious that the anode 22 of the photomultiplier tube 18 is maintained at a potential that is elevated or less negative in value, here substantially at ground potential, than the values of potential accorded to the dynodes 28 and the cathode 20, respectively.

It is evident that during operation of the circuit arrangement 10, the potential gradient that is created in the photomultiplier tube 18 between the cathode 20 and the anode 22 causes any electrons emitted from the cathode 20 to accelerate toward the anode 22, as generally mentioned hereinbefore. In addition to functioning as a means for transforming scintillations of light into corresponding pulses of electrons, the photomultiplier tube 18, as its name indicates, functions to multiply the number of electrons emitted from the cathode 20 and representative of any given scintillation.

The multiplication process occurs through a functioning of the dynodes 28 in the photomultiplier tube 18. In following a path generally toward the anode 22, electrons emitted from the cathode 20 strike a dynode 28 causing multiple electrons to be emitted secondarily from the activated dynode 28. The secondarily emitted electrons then generally follow a path toward the anode 22 under the impetus of the aforementioned potential gradient just as the original cathode electrons had. The secondarily emitted electrons can, of course, successively strike other dynodes 28 at greater potentials, relative to the cathode 20, to increase further the multiplying process. The net effect is that a scintillation from the phosphor transducer 12 causing the emission of a certain number of electrons from the cathode 20 results in the delivery of a multiplied number of electrons, which are representative of the scintillation, to the anode 22 of the photomultiplier tube 18.

The multiplying process just described, however, does not, in many instances, provide a pulse that is suitable in amplitude for use in actuating the aforementioned indicating or control apparatus. Thus, between an anode or output terminal 32 of the photomultiplier tube and the output terminals 14 and 16 of the circuit arrangement 10, an amplifier 34 including a semiconductive element, such as a transistor 36, can be connected. Although an ordinary vacuum tube could perhaps be satisfactorily employed as an amplifying element in the circuit arrangement 10, it is desirable that a semiconductive element, as the transistor 36, be employed as an amplifying element in order to provide operational reliability, a saving of space, and other benefits normally derived from the use of semiconductors.

With the use of the transistor 36, however, a bandwidth problem arises in the transmittal and amplification of any pulses appearing at the anode 22 of the photomultiplier tube 18 for delivery through the output terminals 14 and 16 of the circuit arrangement 10. Thus, to employ currently available semiconductors or transistors having a limited bandwidth capability, any problem arising from the limited bandwidth capability is desirably to be solved by using the transistors in a circuit arrangement such that the problem is obviated by the operational characteristics of the circuit arrangement.

Because the transistor 36 has a limited bandwidth capability, it is desirable that any pulses appearing at the anode 22 of the photomultiplier tube 18 be delivered to the base-emitter path or input of the transistor 36 such that the frequency components of the pulses are substantially within the bandwidth capability of the transistor 36. Considered in other terms, if a pulse appearing at the input of the transistor 36 is of such short duration that it is comprised primarily of elevated frequency components, the pulse, in effect, would not be increased, and perhaps would even be decreased, in amplitude by operation of the transistor 36. Discrimination between pulses at the output terminals 14 and 16, as between those arising from scintillations in the transducer 12 and those randomly arising elsewhere in the circuit arrangement 10, would then be virtually impossible.

On the other hand, if one pulse appearing at the input of the transistor 36 is of such prolonged duration that it is comprised primarily of lower and acceptable frequency components of successive pulses but, due to its relatively long decay period, endures to interfere with a subsequent pulse, resolution of the one and a subsequent pulse at the output terminals 14 and 16 of the transistor 36 would again be virtually impossible because of the rapidity with which the scintillations that cause the pulses are likely to occur. The means by which the invention obviates any problem of the type just described will subsequently become more apparent.

The transistor 36 includes a base electrode 38, an emitter electrode 40, grounded here, and a collector electrode 42, all of which are used for purposes well known in the art of semiconductors. The characteristic impedance to electron flow that exists between the base and emitter electrodes of a transistor is relatively low. Thus, if the anode 22 were directly connected to the base 38 of the transistor 36, an anode pulse, particularly one originating with a rapid decay, would be transmitted to the base 38 of the transistor 36 with a prevalence of high frequency components so that the desired resolution of successive pulses would not be attainable for reasons considered previously. As for the prevalence of high frequency components in the transmitted pulse as a result of the direct connection just described, some explanatory matter will now be set forth.

A capacitor denoted by the dashed outline 44 is included in the circuit arrangement 10 to be representative of stray capacitance between the anode 22 and ground and between a coupling conductor 46 and ground. Now, with simplifying and acceptable assumptions, the current appearing in the base-emitter path of the transistor 36 can be substantially described as a function of time and pertinent circuit parameters by the following equation derived from known and more elemental equalities:

$$i_s(t)=\frac{q}{RC}e^{-t/RC}$$

where $i_s$=the current through the base-emitter path of the transistor 36

$t$=time $q$=the charge appearing at the anode 22 as a result of a scintillation $R$=the serial resistance from the anode 22 through the conductor 46 and the transistor 36 to ground, and $C$=the stray capacitance as represented by the capacitor 44.

If R is comprised only of the relatively low ohmic portion of the impedance between the base 38 and the emitter 40 of the transistor 36, it elementarily follows from inspection of the equation above that the current $i_s$ through the base-emitter path of the transistor 36, once achieving a maximum value as determined by the charge $q$, will decay at a considerable rate because the quantity $e^{-t/RC}$ rapidly decreases in value with a relatively small value for R. It is therefore clear that through the introduction of a circuit element, in the form of a resistor 48, between the anode terminal 32 and the base 38 of the transistor 36, the quantity $e^{-t/RC}$ decreases less rapidly because R, in this instance, includes the value of the resistor 48 and the value of the ohmic portion of the base-emitter impedance of the transistor 36.

Correspondingly, the current $i_s$, comprising a pulse delivered to the input of the transistor 36, decays more slowly than in the case in which the resistor 48 is removed and, therefore, is comprised of lower and more acceptable frequency components. Phrased in terminology common to the art of the invention, the time constant (RC) of the portion of the circuit arrangement 10 between the photomultiplier tube 18 and the transistor 36 is increased through the introduction of the resistor 48. As noted previously, however, the time constant just referred to cannot be too greatly increased because interference would then occur between successive pulses and, additionally, because the maximum amplitude of delivered pulses could then acquire an undesirably low value.

A pulse of charge or electrons, introduced into the transistor base 38, which is biased relative to the emitter 40 with the use of a resistor 49, controls, in a manner well known in the art, a collector-emitter current that flows from a D.C. potential source 51 connected between the output terminal 14 and ground. The variation in collector-emitter current causes a variation in the voltage across an output resistor 50 to be represenaive of the base pulse and, therefore, of the scintillation originally causing the pulse to occur. The voltage variation across the output resistor 50 or the output terminals 14 and 16 can then be used to actuate a flip-flop circuit arrangement or any indicating or control apparatus for eventual indication of the occurrence of the scintillation.

It is to be noted, since the pulse of current flowing in the base-emitter path of the transistor 36 is a function of the time constant defined previously, that the capability of the circuit arrangement 10 to resolve successive pulses, in the manner noted before, is determined, at least in part, by the value of the resistor 48. With a suitably selected value for the resistor 48, the operation of the circuit arrangement 10 provides output pulses of elevated amplitude that correspond, respectively, with scintillations of the transducer 12.

An arrangement of circuit elements 60, shown schematically in FIG. 2, is similar to the arrangement 10 described in FIG. 1, but an additional amplifying element in the form of a pulse transformer 62, having a primary winding 64 and a secondary winding 66, is employed in the circuitry between the anode 22 of the photomultiplier tube 18 and the input of the transistor 36. At this point, it is to be noted that the circuit elements that are common to both FIGS. 1 and 2 have been accorded identical reference characters.

The introduction of the pulse transformer 62, being suitably constructed in a known manner for amplifying or transforming current pulses with acceptable fidelity, provides an amplitude gain for pulses of current appearing at the anode 22 of the photomultiplier tube 18 in proportion to the ratio of the turns of the winding 64 to the turns of the winding 66. The resistance of the secondary winding 66 of the pulse transformer 62, being represented in dashed outline by the resistor 68, operates in the same manner as the resistor 48 of FIG. 1. The latter relationship becomes more apparent when it is considered that the resistance 68 is effectively related to the primary winding 64 of the pulse transformer 62 to impede flow of current pulses appearing at the anode 22 of the photomultiplier tube 18, and, therefore, to be determinative of the aforementioned time constant in the circuitry between the photomultiplier anode 22 and the transistor 36. In addition, a capacitor 69 is included in series with the secondary winding 66 to block the flow of direct currents through the winding 66.

It is to be noted, however, that the secondary winding resistance of any given pulse transformer, in certain applications, may not be satisfactorily determinative of the aforementioned time constant, and added resistance, for example through the connection of a resistance element 53 between the output of the secondary winding 66 of the pulse transformer 62 and the base-emitter path of the transistor 36, would then be necessary, as will be apparent to those versed in this art. Here, as in the circuit arrangement 10 of FIG. 1, scintillation pulses, originating in the transducer 12 and being transformed into current pulses by the photomultiplier tube 18, can be amplified and suitably resolved for actuation of indicating or control apparatus.

An arrangement of circuit elements 70, shown in FIG. 3, is similar to the arrangement 60 of FIG. 2, but here a feedback amplifier 72 is employed. Like reference characters have been used to identify common circuit elements of FIGS. 2 and 3. The feedback amplifier 72, in this example, is provided with a series of NPN transistors 74, 76 and 78, each having the customary operational electrodes. Thus, a base electrode 80, an emitter electrode 82, and a collector electrode 84 are provided for each transistor 74, 76 or 78.

The potential source 51 is connected between the terminal 14 and ground to provide bias potentials for the base 80 and the collector 84 relative to the emitter 82 of each transistor 74, 76 or 78. The bias potential for the base 80 relative to the emitter 82 of the transistors 76, 78 and 80 is controlled through the use of base bias resistors 86, respectively, which have readily determined values that are suitable for amplifying purposes. Similarly, the bias potential of the collector 84 relative to the emitter 82 of the transistors 76, 78 and 80 is controlled through the use of collector bias resistors 88, respectively, which also have readily determined values that are suitable for amplifying purposes.

With the base 80 and the collector 84 being biased positively relative to the emitter 82 of each transistor 74, 76 or 78, electrons, being a substantial portion of a net moving charge, are emitted from the emitter 82 into the base 80 and accelerated to the collector 84 of the transistors 74, 76 and 78. Thus, a quiescent collector-emitter current flows in the transistors 74, 76 and 78 of the feedback amplifier 72.

Inserted between each emitter 82 of the transistors 74, 76 and 78 and a ground terminal 90 is a resistor 92 to compensate the bias potential of the base 80 relative to the emitter 82 of each transistor 74, 76 or 78 for effects of temperature variation. Each of the resistors 92 is paralleled by a capacitor 94 for by-pass of high frequency currents.

The collector 84 of the transistor 74 is coupled with the base 80 of the transistor 76 through the use of a coupling capacitor 96 which transmits variations in the collector-emitter current of the transistor 74 to the base-emitter path of the transistor 76. In order to provide for impedance matching, the emitter 82 of the transistor 76 is then coupled to the base 80 of the transistor 78 through the use of a coupling capacitor 98 which, in effect, transmits variations in the collector-emitter current of the transistor 76 to the base-emitter path of the transistor 78. If desired, an additional bias resistor 100 can be used to impede high frequency components in the base-emitter path of the transistor 78 so that these components are more readily transmitted through a feedback path 102 to the base 80 of the transistor 74.

The feedback amplifier 72, as just noted, is provided with the feedback path 102 from the emitter 82 of the transistor 78 to the base 80 of the transistor 74. A capacitor 104 is provided in the feedback path to isolate the potential source 51 from the emitter 82 of the transistor 78. Additionally, a resistor 106, paralleled by a capacitor 108 for gain compensation as related to frequency, is provided in the feedback path 102 to control the value of current that is fed back to the base 80 of the transistor 74.

The feedback current provides gain stability for the amplifier 72 in that variations in gain attendant to uncontrollable variables, such as manufacturing tolerances and ambient conditions, are offset by variations in the current delivered to the base 80 of the transistor 74 through the introduction of the feedback current. Additionally, some control for the bandwidth capability of the feedback amplifier 72 (either in the form of an increase or, if desired for filtering of stray "noise," in the form of a decrease), is afforded through the use of the compensating capacitor 108 which can be provided with a value that offers minimal impedance to a selected band of frequency components.

The collector 84 of the transistor 78 is connected through a capacitor 109, for blocking purposes, and a primary winding 110 of an output transformer 112 to ground. A secondary winding 114 of the transformer 112 can be connected to the aforementioned indicating or control apparatus for employment of the amplified output pulses delivered by the transistor 78.

The input of the feedback amplifier 72 is coupled with the anode 22 of the photomultiplier tube 18 through circuit elements similar to those described in connection with FIG. 2. Thus, stray capacitance from the anode 22 and the conductor 46 to ground is represented in dashed outline by the capacitor 44, and a pulse transformer 62 is included in the circuit arrangement 70 of FIG. 3. Additionally, in this embodiment of the invention, the resistance element 48 is included in series between the secondary winding 66 of the pulse transformer 62 and the base 80 of the transistor 74 of the feedback amplifier 72. In order to isolate the voltage source 27 from ground, the blocking capacitor 69 is included in the serial path through the secondary winding 66 of the pulse transformer 62 to ground.

If desired, the resistor 53 can be selected in value to be large as related to the input impedance of the feedback amplifier 72. Thus, with an appropriate selection of the value of the resistor 53, the time constant of the circuitry between the photomultiplier anode 22 and the base 80 of the transistor 74 is such as to afford delivery of current pulses, corresponding to transducer scintillations, from the photomultiplier anode 22 to the base 80 of the transistor 74 without departing from the bandwidth capability of the feedback amplifier 72 and without causing interference between successive pulses. In addition, with the use of a relatively large value for the resistor 53, variations in the input impedance of the feedback amplifier 72, due to independent variables, have little or no effect on the time constant just referred to and, in turn, on the character of the delivered pulses.

Each pulse delivered to the base 80 of the transistor 74 controls the current in the collector-emitter path of the transistor 74 in a manner similar to the operations described in connection with FIG. 2. The collector-emitter current variation of the transistor 74 is then transmitted through the impedance matching transistor 76 to be amplified further through the operation of the transistor 78 so that, in net effect, a current pulse of elevated amplitude flows through the collector-emitter path of the transistor 78. Of course, a portion of the amplified pulse is delivered to the base 80 of the transistor 74 through the feedback path 102 for purposes previously indicated. Additionally, the amplified current pulse causes the voltage across the primary winding 110 of the output transformer 112 to vary accordingly.

Through electromagnetic induction, a current pulse, substantially corresponding in form with the original pulse, delivered to the input of the transistor 74 is then deliv d to output terminals 118 and 120 of the feedback amplifier 72 for use with the aforementioned indicating or control apparatus. An example of a known arrangement (not shown) that can be connected with the output terminals 118 and 120 of the feedback amplifier 72 is a flip-flop circuit associated with a computing network to render a record of the total number of pulses delivered to the output terminals 118 and 120. In the latter example, the entire arrangement can be employed as a radiation detector when the photomultiplier tube 18 is positioned to have the transducer 12 located in an environment where radiation is to be measured.

Since the gain of the feedback amplifier 72 is maintained substantially constant through the use of the feedback path 102, the aforementioned flip-flop circuit can be designed to accept only those pulses that are above a predetermined voltage level so that recordation cannot be made of random pulses, of lower voltage level, delivered to the output of the feedback amplifier 72. The latter or discrimination voltage level can be established at a value low enough to permit passage of all pulses having an amplified value equal to the product of the amplification factor of the feedback amplifier 72 and the amplitude of a pulse, corresponding to a scintillation, as delivered to the input of the feedback amplifier 72. Additionally, resolution of successive pulses is provided for those reasons previously considered in connection with the determination of the aforementioned time constant.

To clarify the generalities pointed out in connection with the circuit arrangement 70 of FIG. 3, some statistics associated with a radiation detector that can be embodied in accordance with the principles of the invention will be presented. An embodied detector can be designed to detect radiated beta particles over the range of $10^{-9}$ microcuries per cubic centimeter to $10^{-6}$ microcuries per cubic centimeter.

Such a range of detection results in a delivery of current pulses to the output terminals 118 and 120 of the feedback amplifier 72 over the range of 15 per second to 15,000 per second. In the latter or more dense portion of the range of detection, a median time separation of approximately 70 microseconds exists between successive pulses. To minimize the possibility of any overlapping of the pulses as related to time, and to provide resolution of successive pulses, the resistor 53, in this instance, is provided with a value of resistance such that the time for decay of a pulse delivered to the input of the feedback amplifier 72 is maintained below 7 microseconds. However, the decay time for an input pulse desirably is maintained, in this instance, above a minimum level, such as 2 microseconds, below which the bandwidth capability of the feedback amplifier 72 would become a problem.

In the foregoing description, various arrangements of circuit elements operating in accordance with the principles of the invention have been described. It is intended that these arrangements or embodiments of the invention, as already noted, be illustrative and not limitative of the invention since other embodiments will readily occur to those skilled in the art of the invention. Accordingly, it is desired that the invention be accorded an interpretation consistent with the scope and spirit of its broad principles.

What is claimed is:

1. In combination, a source of electrical pulses occurring successively with each spaced in time from the immediately preceding and subsequent ones by at least a first predetermined amount, an amplifying arrangement including a semiconductive element providing a relatively low input impedance therefor and having a given bandwidth capability, said source being serially connected to the input of said amplifying arrangement through a conductive path including a resistive circuit element of a predetermined impedance value which is of an amount that defines, in cooperation at least with the input impedance of said amplifying arrangement, a prescribed period of duration for said electrical pulses when delivered to the input of said amplifying arrangement, said electrical pulses with their prescribed period of duration occurring, respectively, over a period of time greater than a second predetermined amount for enabling said amplifying arrangement to amplify said electrical pulses substantially within its bandwidth capability yet less than said first predetermined amount for enabling said electrical pulses to remain resolved.

2. In combination, a source of electrical pulses occurring successively with each spaced in time from the immediately preceding and subsequent ones by at least a first predetermined amount, an amplifying arrangement including a semiconductive element providing a relatively low input impedance therefor and having a given bandwidth capability, said source being serially connected to the input of said amplifying arrangement through a conductive path including a resistive circuit element of a predetermined resistance value, the reactance value of stray capacitance existing at least between said conductive path and one terminal of the input of said amplifying arrangement and the resistance value electrically associated with said conductive path including the resistance value of said circuit element being of respective amounts that define, in cooperation with the input impedance of said amplifying arrangement, a prescribed period of duration, respectively, for said electrical pulses when delivered to the input of said amplifying arrangement, said electrical pulses with their prescribed period of duration occurring respectively, over a period of time greater than a second predetermined amount for enabling said amplifying arrangement to amplify said electrical pulses substantially within its bandwidth capability yet less than said first predetermined amount for enabling said electrical pulses to remain resolved.

3. In combination, a source of electrical pulses occurring successively with each spaced in time from the immediately preceding and subsequent ones by at least a first predetermined amount, an amplifying arrangement including a semiconductive element providing a relatively low input impedance therefor and having a given bandwidth capability, said source being coupled to the input of said amplifying arrangement by circuit means including an electromagnetic induction device for amplifying said electrical pulses, said induction device having a primary portion serially connected between said source and one input terminal of said amplifying arrangement, said induction device having a predetermined input resistance value including that reflected from the input of said amplifying arrangement, the reactance value of stray capacitance existing relative to said one terminal of the input of said amplifying arrangement and the input resistance value of said induction device being of respective amounts that cooperatively define a prescribed period of duration, respectively, for said electrical pulses when delivered to the input of said amplifying arrangement, said electrical pulses with their prescribed period of duration occurring, respectively, over a period of time greater than a second predetermined amount for enabling said amplifier to amplify said electrical pulses substantially within its bandwidth capability yet less than said first predetermined amount for enabling said electrical pulses to remain resolved.

4. In combination, a source of electrical pulses occurring successively with each spaced in time from the immediately preceding and subsequent ones by at least a first predetermined amount, an amplifying arrangement including feedback means for gain stabilization and including a semiconductive element so as to provide a relatively low input impedance therefor and having a given bandwidth capability, said source being coupled to the input of said amplifying arrangement by circuit means including an electromagnetic induction device for amplifying said electrical pulses, said induction device having a primary portion serially connected between said source and one input terminal of said amplifying arrangement, said induction device having a predetermined input impedance value, the input impedance value of said induction device being substantially larger than the input impedance of said amplifying arrangement to define, irrespectively of ordinary variations in the latter, a prescribed period of duration for said electrical pulses when delivered to the input of said amplifying arrangement, said prescribed period of duration of the delivered electrical pulses occurring over a period of time greater than a second predetermined amount for enabling said amplifying arrangement to amplify said electrical pulses substantially within its bandwidth capability yet less than said first predetermined amount for enabling said electrical pulses to remain resolved.

5. In combination, a source of electrical pulses occurring successively with each spaced in time from the immediately preceding and subsequent ones by at least a first predetermined amount, means for amplifying said electrical pulses, said amplifying means including a semiconductive element providing a relatively low input impedance therefor and having a given bandwidth capability, and circuit means for transmitting said electrical pulses from said source to the input of said amplifying means, said circuit means having impedance means including a resistive element effectively serially coupling the input of said amplifying means with said pulse source, said impedance means being so correlated as to provide that when delivered to the input of said amplifying means said electrical pulses endure, respectively, over a period of time greater than a second predetermined amount for enabling said amplifying means to amplify said electrical pulses substantially within its bandwidth capability yet less than said first predetermined amount for enabling said electrical pulses to remain resolved.

6. In combination, a source of electrical pulses occurring successively with each spaced in time from the immediately preceding and subsequent ones by at least a first predetermined amount, means for amplifying said electrical pulses, said amplifying means including a semiconductive element providing a relatively low input impedance therefor and having a given bandwidth capability, and circuit means for transmitting said electrical pulses from said source to the input of said amplifying means, said circuit means including inductive means for amplifying said electrical pulses, and said circuit means having impedance means including a resistive element so connected as effectively to be related serially between the input of said amplifying means and said pulse source, said impedance means being so correlated as to provide that when delivered to the input of said amplifying means said electrical pulses endure, respectively, over a period of time greater than a second predetermined amount for enabling said amplifying means to amplify said electrical pulses substantially within its bandwidth capability yet less than said first predetermined amount for enabling said electrical pulses to remain resolved.

References Cited in the file of this patent

UNITED STATES PATENTS

| | | |
|---|---|---|
| 2,676,214 | Van Weel | Apr. 20, 1954 |
| 2,712,081 | Fearon et al. | June 28, 1955 |
| 2,717,316 | Madey | Sept. 6, 1955 |
| 2,732,440 | Newman | Jan. 24, 1956 |
| 2,843,743 | Hamilton | July 15, 1958 |
| 2,863,955 | Keonjian | Dec. 9, 1958 |
| 3,001,144 | Dendl | Sept. 19, 1961 |